United States Patent
Stemmler et al.

(10) Patent No.: US 6,595,432 B2
(45) Date of Patent: Jul. 22, 2003

(54) HEATING SYSTEM FOR HEATING THE PASSENGER COMPARTMENT OF AN AUTOMOBILE

(75) Inventors: Martin Stemmler, Penzing (DE); Ingrid Lanzl, Munich (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 0 days.

(21) Appl. No.: 09/979,312

(22) PCT Filed: Mar. 19, 2001

(86) PCT No.: PCT/EP01/03103

§ 371 (c)(1), (2), (4) Date: Feb. 20, 2002

(87) PCT Pub. No.: WO01/70528

PCT Pub. Date: Sep. 27, 2001

(65) Prior Publication Data

US 2003/0098297 A1 May 29, 2003

(30) Foreign Application Priority Data

Mar. 22, 2000 (DE) .......................................... 100 14 011

(51) Int. Cl.$^7$ ................................................. B60H 1/02
(52) U.S. Cl. .................. 237/12.3 B; 137/341; 219/201
(58) Field of Search ...................... 237/12.3 B, 12.3 R; 165/41, 42; 123/142.5 E; 137/341; 219/201; 392/479

(56) References Cited

U.S. PATENT DOCUMENTS

| | | | | |
|---|---|---|---|---|
| 2,266,216 A | * | 12/1941 | Kimberlin .................... 219/208 |
| 3,626,148 A | * | 12/1971 | Woytowich et al. .. 123/142.5 E |
| 3,969,605 A | * | 7/1976 | Danell .................. 123/142.5 E |
| 4,208,570 A | * | 6/1980 | Rynard ................. 123/142.5 E |
| 5,408,960 A | * | 4/1995 | Woytowich .......... 123/142.5 E |
| 5,938,523 A | * | 8/1999 | Khelifa et al. .............. 454/156 |
| 6,010,076 A | | 1/2000 | Winik |
| 6,332,330 B1 | * | 12/2001 | Loup et al. .................... 165/42 |

FOREIGN PATENT DOCUMENTS

| | | |
|---|---|---|
| DE | 44 33 814 | 3/1996 |
| DE | 197 19 487 | 11/1998 |
| DE | 197 30 678 | 1/1999 |
| FR | 2 770 626 | 5/1999 |

\* cited by examiner

Primary Examiner—Derek Boles
(74) Attorney, Agent, or Firm—Nixon Peabody LLP; David S. Safran

(57) ABSTRACT

A heating system for heating the interior of a motor vehicle including a liquid circuit for dissipating engine heat and delivering heat to the vehicle interior, a valve block for controlling the liquid flow in the liquid circuit, and an electric heating device integrated into the valve block to heat the liquid flowing through the valve block.

13 Claims, 3 Drawing Sheets

HEATING SYSTEM FOR HEATING THE PASSENGER COMPARTMENT OF AN AUTOMOBILE

This invention relates to a system for heating of the interior of a motor vehicle as claimed in the preamble of claim 1.

One problem in conventional motor vehicle heating systems in which hot air is produced by heat exchange with the engine coolant consists in that after starting the engine a certain time interval is necessary for the coolant to become hot enough to perform a heating function. DE 44 33 81 A1 discloses a generic heating system in which an additional electrical heating element which is formed by a metal tube is integrated into the coolant circuit. The jacket surface of the tube is in direct contact with PTC heating elements which are supplied with electricity from the vehicle electrical system to heat the tube and thus also the coolant flowing through the tube independently of the heat supply by the motor vehicle engine.

DE 197 19 487 A1 proposes that a heating vessel which is provided with a microwave source to heat coolant independently of the vehicle engine be integrated into the coolant circuit of the motor vehicle.

The defect in this known heating system is the fact that providing additional water heaters entails high installation cost and high installation space requirement.

The object of this invention is to devise a heating system which allows heating of the liquid in the coolant circuit independently of the engine and does not entail high installation effort and installation space requirement.

This object is achieved as claimed in the invention by a heating system as is defined in claim 1. In this approach as claimed in the invention it is advantageous for the electrical heating device to be integrated into a component of the coolant circuit which is present anyway so that the installation cost and the installation space requirement for this coolant heating independent of the engine can be kept low.

Preferred embodiments of the invention are given in the dependent claims.

In motor vehicles with water-cooled engines, in the coolant circuit there is conventionally at least one valve block to control the coolant flow conventionally depending on the temperature of the coolant or the pressure. This invention is aimed at integrating an electrical heating device into this valve block to heat the coolant flowing through the valve block. Since in this way additional electrical heating is integrated into a component which is present anyway, no additional installation space is required and installation is kept simple; this keeps costs low. The heating device is preferably one or more PTC (positive temperature coefficient) heating elements which are in direct thermal contact with the valve block in order to heat it. The heating elements can be located on the outside of the valve block. The heating elements are supplied with electricity from the vehicle electrical system, the wiring preferably being chosen such that the heating elements are supplied with electricity only with the generator running, in order to prevent discharge of the vehicle battery.

After starting the engine, thus faster heating of the coolant can be achieved by means of the additional electrical heating device in the coolant valve block, enabling faster heating of the motor vehicle interior.

The system control is preferably designed such that when a heat exchange medium is being heated (for example by the operation of an internal combustion engine or an additional motor vehicle heater) the electrical heat output is reduced accordingly or completely stopped.

One example of the invention is explained below using the drawings.

Figure 1:
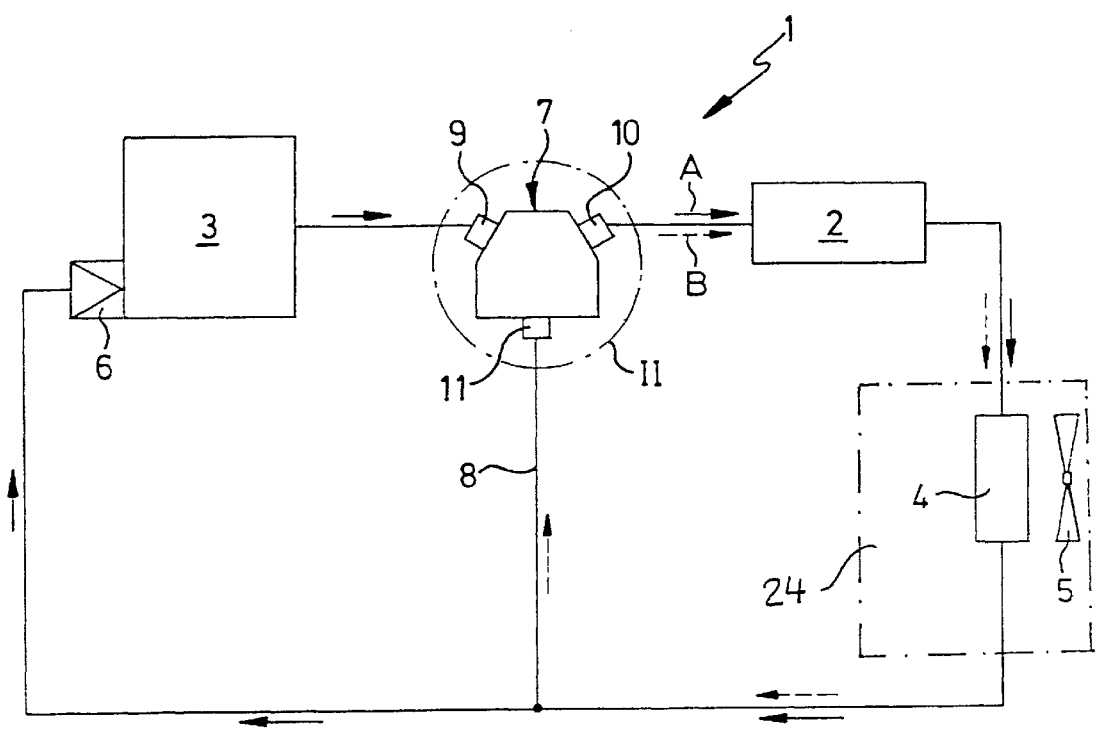
FIG. 1 shows a schematic view of the heating system with a valve block.

The heat exchange medium circuit 1 shown in FIG. 1 comprises an internal combustion engine 3, a heater 2 which can be operated independently of the engine, and the vehicle's own heat exchanger 4, to which a vehicle fan 5 is assigned which delivers heated air in the vehicle interior 24. The solid arrows A show the so-called major heat exchange medium circuit. In it the liquid heat exchange medium, proceeding from the internal combustion engine 3, using a coolant delivery pump 6 assigned to it is conveyed in the direction to the valve block 7. From there the heat exchange medium travels to the heater 2 which is operated independently of the engine, continues through the vehicle's own heat exchanger 4 and then back to the intake side of the coolant delivery pump 6 on the inlet side of the internal combustion engine 3.

Broken arrows B label a so-called "island circuit" in which the internal combustion engine 3 is decoupled from through-flow. In this island circuit the heat exchange medium flows heated through the heater 2 which can be operated independently of the engine though the vehicle's own heat exchanger 4 and back via the bypass line 8, circumventing the internal combustion engine 3 to the valve block 7, via which the heat exchange medium is in turn routed to the inlet side of the heater 2 which can be operated independently of the engine.

When the island circuit as shown by the broken arrows B is implemented using the valve block 7, the heat exchange medium does not flow through the internal combustion engine 3, and the vehicle interior 24 or another space to be heated can be efficiently heated via the vehicle's own heat exchanger 4 in conjunction with the heater 2 which can be operated independently of the engine.

Figure 2:
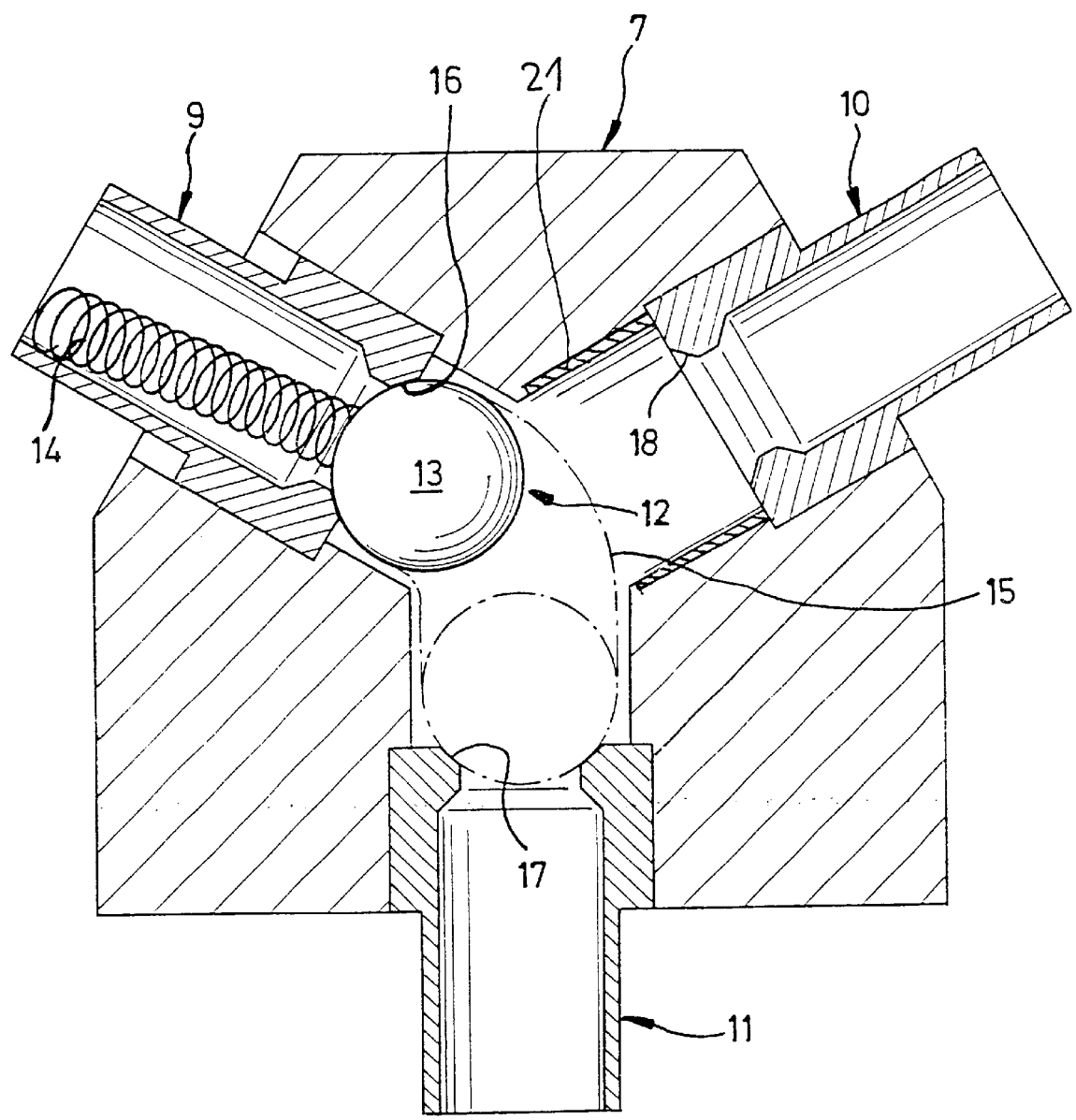
FIG. 2 shows a schematic view of a first embodiment of the valve block with the assigned valve means.

Details of the valve block 7 are explained below with reference to FIG. 2 using a first preferred embodiment. In FIG. 2 the valve block 7 encompasses connections 9, 10, and 11 which are arranged in a star. The connection 9 (see FIG. 1) is connected to the line section coming from the internal combustion engine 3. The connection 10 is connected to the line section leading to the heater 2 which can be operated independently of the engine. The connection 11 is connected to the bypass line 8 which comes from the output of the vehicle's own heat exchanger 4. In the valve block 7 as shown in FIG. 2 there is a valve element 12 in the form of a ball 13 which is preloaded by means of a spring 14 into the position shown in FIG. 2 and in which the valve block 7 allows decoupling of the part of the heat exchange medium circuit assigned to the internal combustion engine 3. Via the path 15 of motion which is curved or which runs in an arc, the valve element 12 can be moved into the position shown by the broken line and in which the connection 11 joined to the bypass line and thus the bypass line 8 are cut off. In the position of the valve element 12 shown by broken lines thus the heat exchange medium circuit labelled A in FIG. 1 is made ready, while in the position of the valve element 12 shown by solid lines the heat exchange medium circuit B in FIG. 1 is implemented. At least the ends of the connections 9 and 11 which interwork with the valve element 12 in the valve block 7 have seats 16 and 17 by which reliable closure in cooperation with the valve element 12 in the respective operating position thereof is achieved.

To design the valve block 7 to be as versatile as possible, feasibly the connection 10 which leads to the heater 2 which can be operated independently of the engine has a correspondingly configured seat 18. The arc-shaped path 15 of motion for the valve element 12 is formed by the corresponding walls in the valve block 7.

An electrical heating element 21 which is preferably designed as a PTC heating element is integrated into the valve block 7 as claimed in the invention. In the example as shown in FIG. 2 the heating element 21 is located in the area of the connection 10 which leads to the heater 2. Since flow takes place through this connection both in the major circuit including the internal combustion engine and also in the island circuit, arrangement at this location is especially advantageous. The electrical heating element 21 can contribute to faster heating of the heat exchange medium in the two circuit versions. The electrical heating element 21 is made in the form of a sleeve or several sleeve segments. But likewise a plate-shaped heating element can be accomplished. Instead of in the body of the valve block 7, integration of the heating element 21 in one of the connections 9, 10 and 11 belonging to the valve block 7 is also possible, here in turn the connection 10 being preferred.

Figure 3:
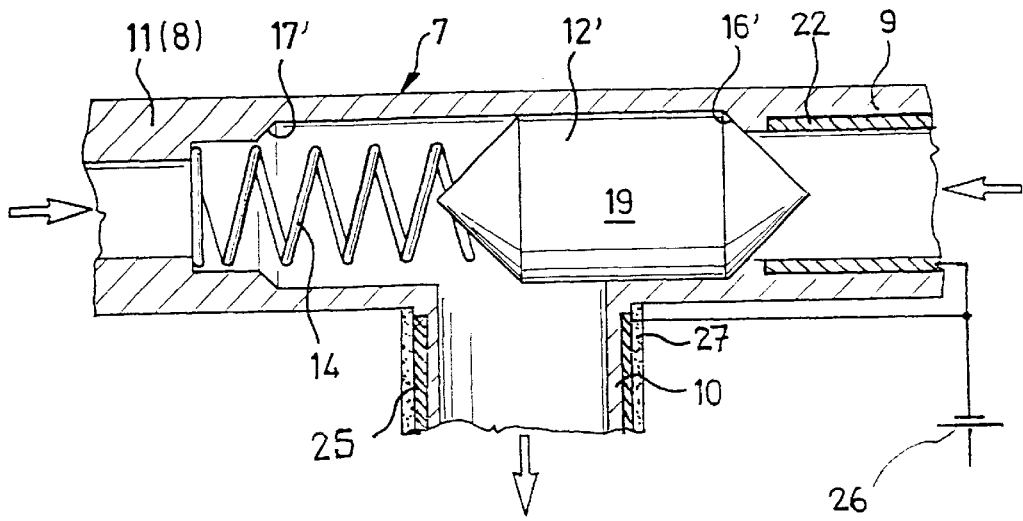
FIG. 3 shows a schematic view of a second preferred embodiment of a valve block with the assigned valve means.
Figure 4:
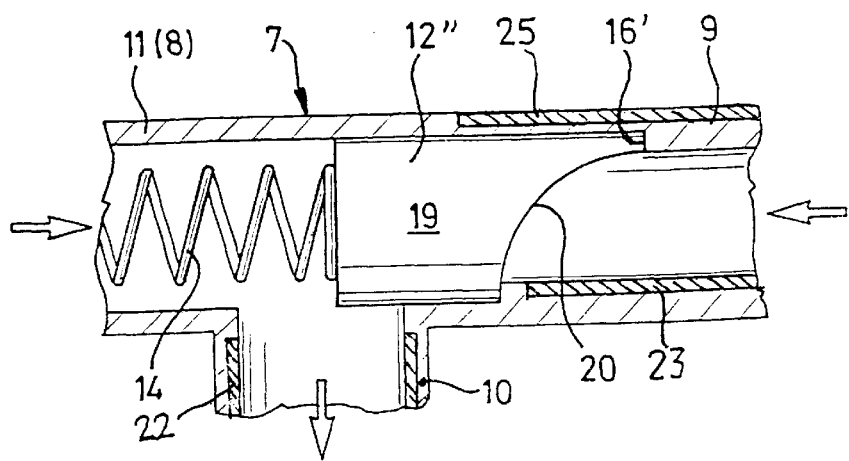
FIG. 4 shows another embodiment of a valve means as claimed in the invention.

In FIGS. 3 and 4 the same or similar parts as in the above explained embodiment are provided with the same reference numbers, which are labelled however with "or" to distinguish them.

In FIGS. 3 and 4 there is a valve element 12', 12" which can move in a straight line. The valve element 12' in FIG. 3 is made in the form of a slide 19 which is preloaded by means of a spring 14 into the position shown in FIG. 1. In order to effect reliable tight closure in the respective operating positions of the valve element 12', the two opposing ends of the slide 19 can be made conical for example, so that flat contact against the assigned seat surfaces 16', 17' is achieved.

In the embodiment as shown in FIG. 4, the valve element 12" is made similarly to FIG. 3 as a slide which can move linearly, but in it one end is provided with a contour 20 which is more streamlined for deflection of the flow of the heat exchange medium.

The valve block 7 which is provided in the invention enables implementation of the major heat exchange medium circuit as shown by arrows A or the island circuit as shown by arrows B according to the operating position of the valve element 12, 12', 12".

If the connection 9 of the valve block 7 coming from the internal combustion engine 3 is cut off using the valve element 12, 12', 12", the heat exchange medium is intaken via the now open bypass line 8 by the heater 2 which can be operated independently of the engine and delivered in the heat exchange medium circuit labelled B. The internal combustion engine 3 is bypassed here and has been stopped.

When the internal combustion engine 3 is operating, the heat exchange medium is conveyed using the coolant delivery pump 6 and by the delivery pressure of the heat exchange medium the valve element 12, 12', 12" is moved into the position in which the bypass line 8 is blocked so that then the heat exchange medium in the valve block 7 travels to the connection 10 which leads from the heater 2 which can be operated independently of the engine, so that the heat exchange medium flows through the circuit labelled with arrows A in FIG. 1. If the internal combustion engine 3 is turned off, the valve element 12, 12', 12" is moved by preloading by means of the spring 14 into the position in which the connection 9 coming from the internal combustion engine 3 is cut off and the bypass line 8 is open. Using the valve block 7 thus fluid-mechanical switching of the heat exchange medium circuit is implemented such that without additional electrical accessory controls the desired operating positions of the valve block 7 can be implemented depending on whether the internal combustion engine 3 is running or not.

FIGS. 3 and 4 show other arrangements of the electrical heating elements 22, 23, and 25. The heating element 21 in FIG. 3 in the area of the connection 9 is made as an inside heating element while the heating element 25 is located outside around the connection 10. When the heating elements 25 are located to the outside it is advantageous if they are covered to the outside by an insulating layer 27 to prevent energy losses.

In FIG. 4, in the area of the connection 9 there is an inside heating element 23 and in addition or alternatively an outside heating element 25 which in turn is advantageously covered to the outside by an insulating layer which is not shown. In the area of the connection 10 there is also an inside heating element 22.

All the heating elements 21, 22, 23 or 25 are preferably made as PTC heating elements with a positive temperature/resistance characteristic and are connected via lines to the vehicle electrical system, of which in FIG. 3 there is only the vehicle battery 26, by way of example.

Instead of an inside heating element 21, 22 and 23 or an outside heating element 25, especially when the valve block 7 is made as a casting one or more electrical heating elements can be integrated into the wall of valve block so that neither insulation against the liquid heat exchange medium, as in the case of the heating element which lies to the inside, nor protection against heat losses or damage as in the case of the heating element which lies to the outside, need be provided.

REFERENCE NUMBER LIST 1 heat exchange medium circuit overall
2 heating device which can be operated independently of the engine
3 internal combustion engine
4 vehicle's own heat exchanger
5 vehicle fan
6 coolant delivery pump
7 valve block
8 bypass line
9 connection
10 connection
11 connection
12, 12', 12" valve element
13 ball
14 spring
15 path of motion
16, 16' seat for 9
17, 17' seat for 11
18 seat for 10
19 slide
20 streamlined contour
21 electrical heating device
22 electrical heating device
23 electrical heating device
24 vehicle interior
25 electrical heating device
26 vehicle battery 27 insulating layer
A major heat exchange medium circuit
B "island" heat exchange medium circuit

What is claimed is:

1. Heating system for heating the interior of a motor vehicle, comprising:
    a liquid circuit for allowing a flow of a liquid therethrough to thereby dissipate engine heat and deliver heat to the vehicle interior;
    a valve block for controlling said liquid flow through said liquid circuit; and
    an electric heating device integrated into said valve block for heating said liquid as it flows through said valve block.

2. Heating system as claimed in claim 1, wherein said electric heating device comprises at least one PTC heating element.

3. Heating system as claimed in claim 2, wherein said at least one PTC heating element is in direct thermal contact with said valve block.

4. Heating system as claimed in claim 2, wherein said at least one PTC heating element is located on an outer surface of said valve block.

5. Heating system as claimed in claim 2, wherein said at least one PTC heating element is powered by the motor vehicle electrical system.

6. Heating system as claimed in claim 1, wherein said heating device is in direct thermal contact with said valve block.

7. Heating system as claimed in claim 6, wherein said heating device is located on an outer surface of said valve block.

8. Heating system as claimed in claim 6, wherein said heating device is powered by a motor vehicle electrical system.

9. Heating system as claimed in claim 1, wherein said heating device is located on an outer surface of said valve block.

10. Heating system as claimed in claim 9, wherein said heating device is powered by a motor vehicle electrical system.

11. Heating system as claimed in claim 1, wherein said heating device is powered by a motor vehicle electrical system.

12. Heating system as claimed in claim 1, wherein at least one inlet valve and an outlet valve are integrated into the valve block.

13. Heating system as claimed in claim 11, wherein said valve block has a plurality of inlet connections for receiving said liquid from respective portions of the liquid circuit and a single outlet connection for delivering fluid from said valve block to a further portion said liquid circuit.

* * * * *